US011984674B2

(12) United States Patent
Chiba et al.

(10) Patent No.: US 11,984,674 B2
(45) Date of Patent: May 14, 2024

(54) ANTENNA DEVICE

(71) Applicants: Seiki Chiba, Tokyo (JP); Mikio Waki, Sakura (JP); ZEON CORPORATION, Tokyo (JP)

(72) Inventors: Seiki Chiba, Tokyo (JP); Mikio Waki, Sakura (JP); Keisuke Oguma, Settsu (JP); Shinji Ozawa, Settsu (JP)

(73) Assignees: Selki Chiba, Tokyo (JP); Mikio Waki, Sakura (JP); ZEON CORPORATION, Tokyo (JP)

( * ) Notice: Subject to any disclaimer, the term of this patent is extended or adjusted under 35 U.S.C. 154(b) by 0 days.

(21) Appl. No.: 17/636,445

(22) PCT Filed: Aug. 19, 2019

(86) PCT No.: PCT/JP2019/032254
§ 371 (c)(1),
(2) Date: Feb. 18, 2022

(87) PCT Pub. No.: WO2021/033232
PCT Pub. Date: Feb. 25, 2021

(65) Prior Publication Data

US 2022/0294117 A1 Sep. 15, 2022

(51) Int. Cl.
*H01Q 9/14* (2006.01)
*H01Q 3/16* (2006.01)
(Continued)

(52) U.S. Cl.
CPC ................. *H01Q 9/14* (2013.01); *H01Q 3/16* (2013.01); *H01Q 15/18* (2013.01); *H01Q 19/10* (2013.01); *H01Q 19/30* (2013.01)

(58) Field of Classification Search
CPC ........... H01Q 9/14; H01Q 3/16; H01Q 15/18; H01Q 19/10; H01Q 19/16; H01Q 9/30;
(Continued)

(56) References Cited

U.S. PATENT DOCUMENTS

| | | | | |
|---|---|---|---|---|
| 2,834,012 A * | 5/1958 | Allen | H01Q 9/14 | 267/156 |
| 3,653,053 A * | 3/1972 | St. Vrain | H01Q 9/14 | 343/750 |

(Continued)

FOREIGN PATENT DOCUMENTS

| | | |
|---|---|---|
| JP | 64002407 A * | 1/1989 |
| JP | S642407 A | 1/1989 |

(Continued)

OTHER PUBLICATIONS

Oct. 8, 2019, International Search Report issued in the International Patent Application No. PCT/JP2019/032254.

*Primary Examiner* — Dieu Hien T Duong
*Assistant Examiner* — Jordan E. DeWitt
(74) *Attorney, Agent, or Firm* — KENJA IP LAW PC

(57) ABSTRACT

The antenna device A1 includes an antenna 1 configured to transmit and/or receive radio waves, and a dielectric elastomer drive element 2 including a dielectric elastomer layer 21 and a pair of electrode layers 22 sandwiching the dielectric elastomer layer 21. The dielectric elastomer drive element is capable of changing an antenna characteristic of the antenna 1. With such a configuration, the antenna device can be made smaller and lighter while improving its antenna characteristics.

6 Claims, 6 Drawing Sheets

(51) Int. Cl.
*H01Q 15/18* (2006.01)
*H01Q 19/10* (2006.01)
*H01Q 19/30* (2006.01)

(58) Field of Classification Search
CPC ........... H01Q 9/16; H01Q 1/10; H01Q 1/085; H01Q 1/103; H01Q 19/30
See application file for complete search history.

(56) References Cited

U.S. PATENT DOCUMENTS

| | | | | | |
|---|---|---|---|---|---|
| 4,176,360 | A * | 11/1979 | Leavy | H01Q 1/10 | 343/883 |
| 4,658,260 | A * | 4/1987 | Myer | H01Q 5/40 | 343/903 |
| 5,017,935 | A * | 5/1991 | Hayashi | H01Q 1/10 | 343/858 |
| 5,079,558 | A * | 1/1992 | Koike | H01Q 1/10 | 343/702 |
| 5,982,332 | A * | 11/1999 | Lewis, Jr. | H01Q 9/16 | 343/750 |
| 6,337,671 | B1 * | 1/2002 | Lee | H01Q 3/02 | 343/702 |
| 6,376,971 | B1 * | 4/2002 | Pelrine | H04R 5/02 | 977/788 |
| 8,059,060 | B2 * | 11/2011 | Barter | H01Q 9/30 | 343/878 |
| 8,436,784 | B2 * | 5/2013 | Jalali Mazlouman | H01Q 9/14 | 343/895 |
| 2002/0036594 | A1 * | 3/2002 | Gyenes | H01Q 1/10 | 343/900 |
| 2003/0231138 | A1 * | 12/2003 | Weinstein | H01Q 9/065 | 343/810 |
| 2005/0243015 | A1 * | 11/2005 | Kfoury | H01Q 1/1207 | 343/702 |
| 2008/0111761 | A1 * | 5/2008 | Kan | H01Q 9/27 | 343/873 |
| 2009/0153418 | A1 * | 6/2009 | Park | H01Q 9/30 | 343/702 |
| 2011/0034913 | A1 * | 2/2011 | Brannan | A61B 18/1487 | 606/41 |
| 2011/0063185 | A1 * | 3/2011 | Lin | H01Q 9/16 | 343/900 |
| 2014/0247193 | A1 * | 9/2014 | Parsche | H01Q 5/321 | 343/791 |
| 2015/0320295 | A1 * | 11/2015 | Belson | H10N 30/857 | 600/141 |
| 2017/0155032 | A1 * | 6/2017 | Chiba | B25J 15/0009 | |
| 2021/0143756 | A1 * | 5/2021 | Chiba | H10N 30/30 | |

FOREIGN PATENT DOCUMENTS

| | | | | |
|---|---|---|---|---|
| JP | 2007201561 | A * | 8/2007 | |
| JP | 2007201561 | A | 8/2007 | |
| JP | 2012095527 | A | 5/2012 | |
| WO | 2012066452 | A1 | 5/2012 | |
| WO | WO-2012066452 | A1 * | 5/2012 | H01F 21/04 |

* cited by examiner

ANTENNA DEVICE

TECHNICAL FIELD

The present invention relates to an antenna device that is capable of changing the antenna characteristics by using a dielectric elastomer drive element.

BACKGROUND ART

The voltage standing wave ratio (VSWR) in transmitting and receiving radio waves of a certain frequency is a typical example of antenna characteristics. Antenna devices have been proposed that aim to reduce the VSWR of radio waves of a wider range of frequencies. An example of antenna device capable of changing such an antenna characteristic is disclosed in Patent Document 1. The antenna device of this patent document uses a motor to expand and contract the antenna to change the antenna characteristic so that radio waves in a wider frequency band can be transmitted and received. Meanwhile, in recent years, MIMO (multiple-input and multiple-output) has been proposed as a new wireless communication system. MIMO uses multiple antennas at both the transmitter and the receiver to improve the communication quality. In such a system, it is desirable to optimize the antenna characteristics of each antenna according to the transmission and reception conditions.

TECHNICAL REFERENCE

Patent Document

Patent Document 1: JP-A-S64-2407

SUMMARY OF THE INVENTION

Problems to be Solved by the Invention

However, the motor as a drive source has a certain amount of volume and is relatively heavy as it is made of metal parts. Thus, reductions in size and weight of the antenna device are limited by the motor. Also, the motor can be regarded as a conductor for the transmission and reception of radio waves and may raise (undesirably) the voltage standing wave ratio or serve as a shield that blocks radio waves.

The present invention has been conceived under the above circumstances and aims to provide an antenna device that can be made smaller and lighter while improving its antenna characteristics.

Means for Solving the Problems

The antenna device provided according to the present invention comprises: an antenna configured to transmit and/or receive radio waves; and a dielectric elastomer drive element including a dielectric elastomer layer and a pair of electrode layers sandwiching the dielectric elastomer layer, where the dielectric elastomer drive element is capable of changing an antenna characteristic of the antenna.

In a preferred embodiment of the present invention, the antenna characteristic is a voltage standing wave ratio for each frequency that depends on a specific physical quantity of the antenna, and the dielectric elastomer drive element is capable of changing the specific physical quantity.

In a preferred embodiment of the present invention, the specific physical quantity is a physical length of an antenna element of the antenna.

In a preferred embodiment of the present invention, the antenna is a monopole antenna or a dipole antenna.

In a preferred embodiment of the present invention, the antenna is a corner reflector antenna including an antenna element and a reflector part. The antenna characteristic is a voltage standing wave ratio that depends on at least one of a distance between the antenna element and the reflector part and an angle of the reflector part. The dielectric elastomer drive element is capable of changing at least one of the distance between the antenna element and the reflector part and the angle of the reflector part.

In a preferred embodiment of the present invention, the antenna is a Yagi-Uda Antenna including a reflector, a radiator and a director arranged in a mentioned order. The antenna characteristic is a voltage standing wave ratio that depends on at least one of distances among the reflector, the radiator and the director. The dielectric elastomer drive element is capable of changing at least one of the distances among the reflector, the radiator and the director.

Advantages of the Invention

According to the present invention, the antenna device can be made smaller and lighter while improving its antenna characteristics for a wider frequency band.

Other features and advantages of the present invention will become apparent from the following detailed description with reference to the accompanying drawings.

MODE FOR CARRYING OUT THE INVENTION

Preferred embodiments of the present invention are described below with reference to the accompanying drawings.

First Embodiment

Figure 1:
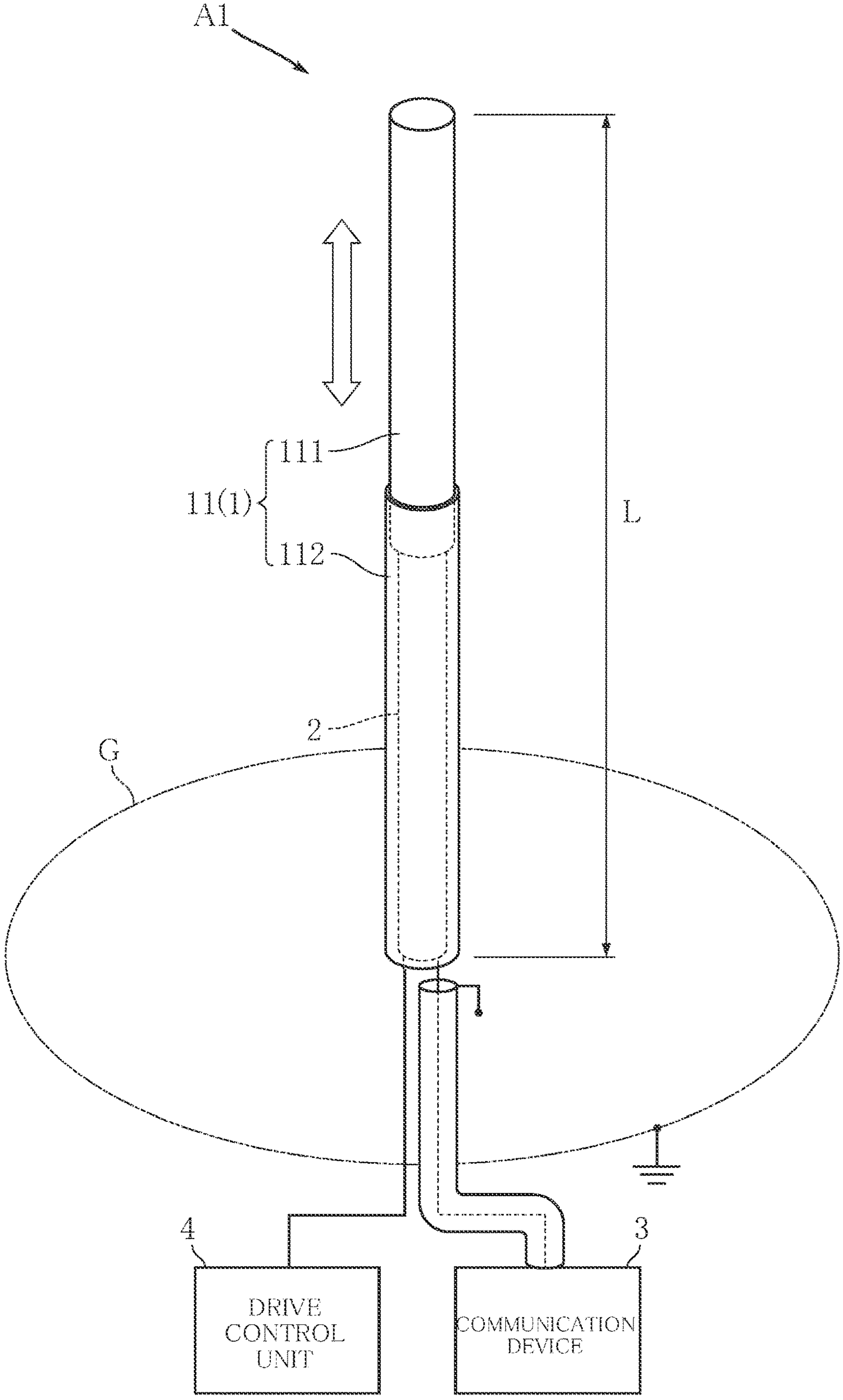
FIG. 1 is a configuration diagram of an antenna device according to a first embodiment of the present invention.
Figure 2:
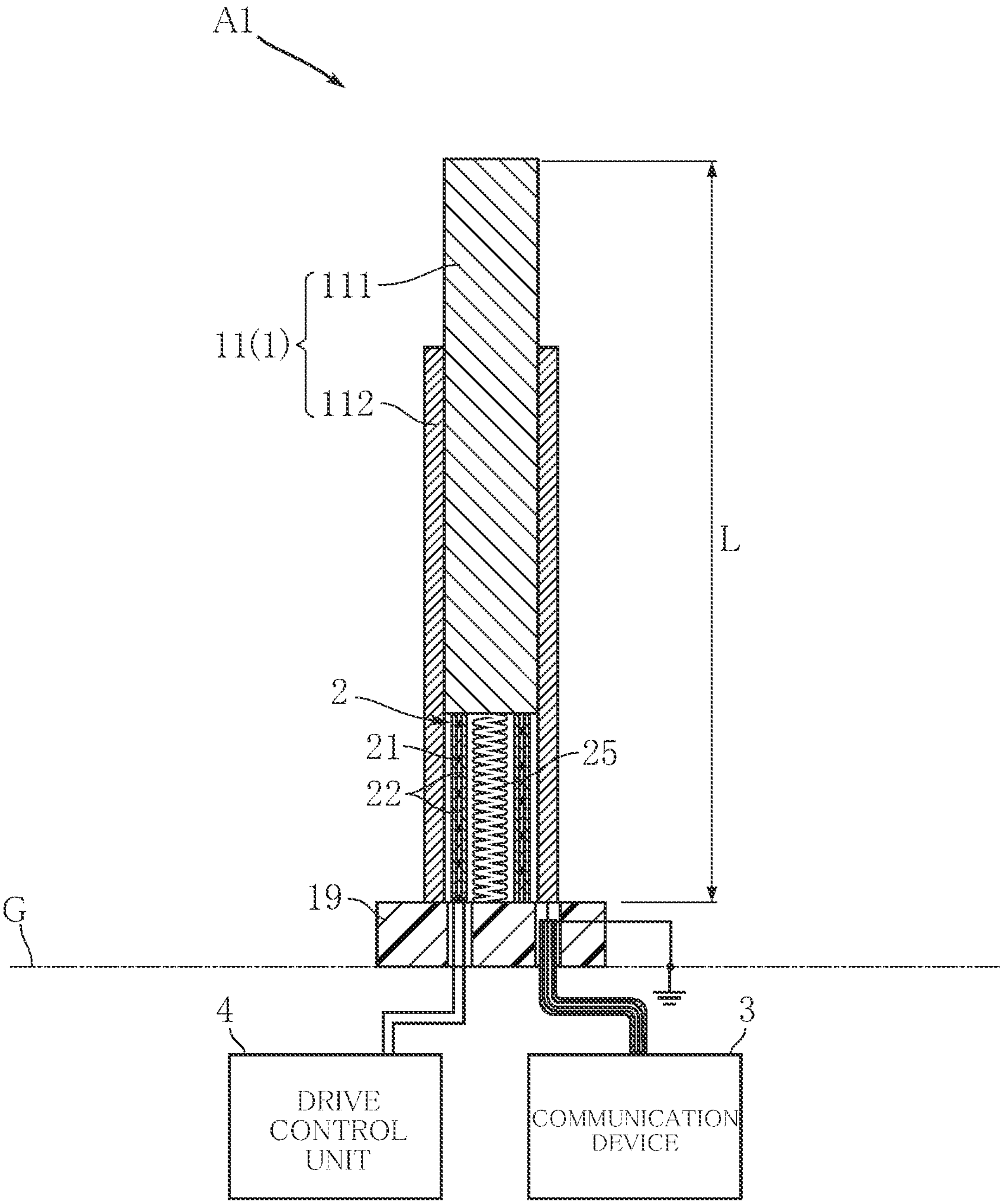
FIG. 2 is a sectional view of the antenna device according to the first embodiment of the present invention.
Figure 3:
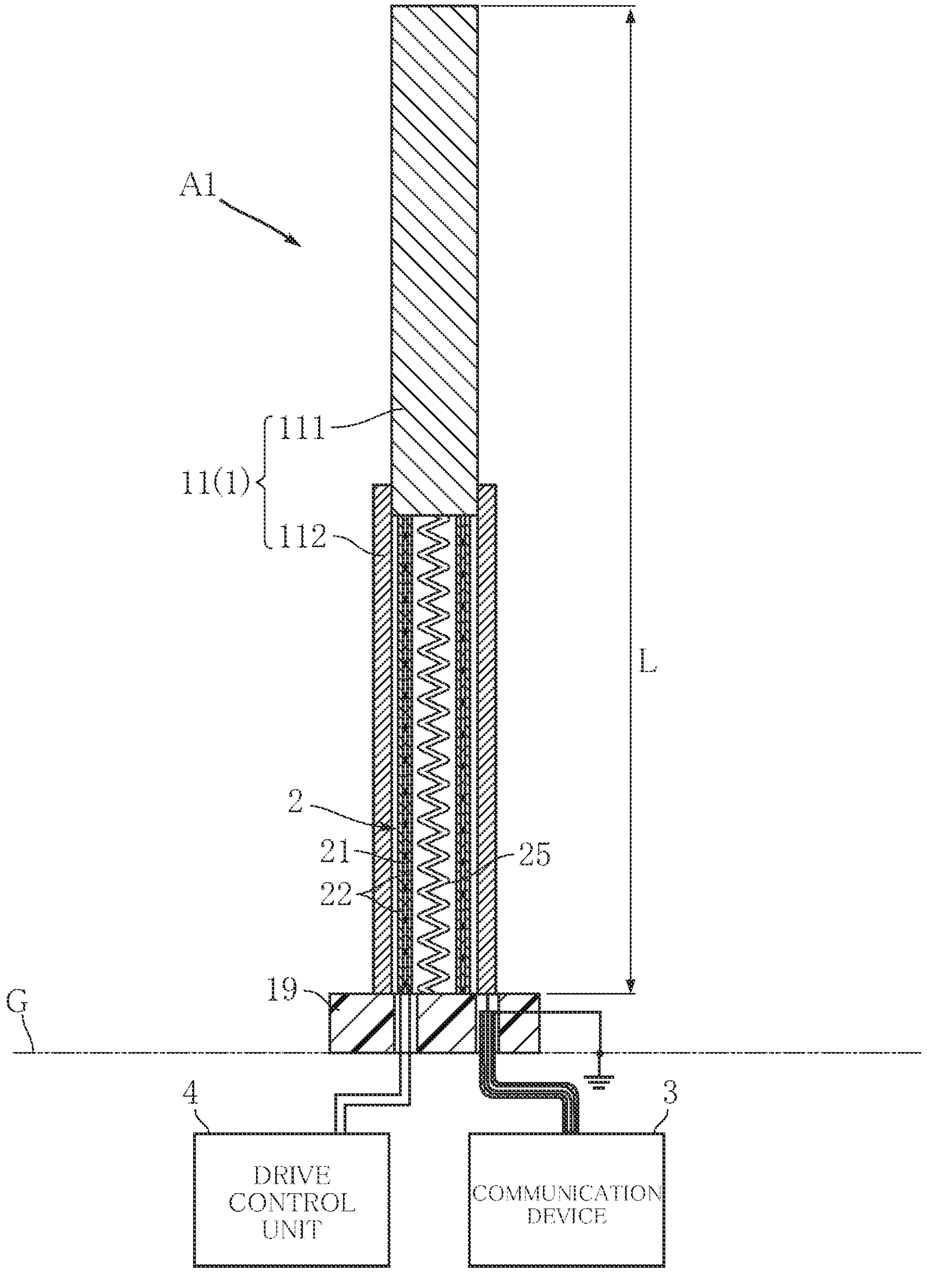
FIG. 3 is a sectional view of the antenna device according to the first embodiment of the present invention.

FIGS. 1-3 show an antenna device according to a first embodiment of the present invention. The antenna device A1 of the present embodiment includes an antenna 1, a dielectric elastomer drive element 2, a communication device 3 and a drive control unit 4.

The antenna 1 is configured to transmit high-frequency electric energy into space as radio waves and/or to receive radio waves as high-frequency electric energy. The antenna 1 of the present embodiment is configured as a monopole antenna and is constituted of a single antenna element 11. The antenna element 11 is installed in an upright posture with respect to the ground surface G.

The antenna element 11 of the present embodiment is constituted of a first member 111 and a second member 112.

The first member 111 and the second member 112 each are a rod-shaped member made of a metal. In the illustrated example, the second member 112 has a cylindrical shape, and at least a part of the first member 111 is housed in the second member 112. The first member 111 may be a solid rod-shaped member or may be a cylindrical member. The first member 111 and the second member 112 are slidable relative to each other. Thus, the antenna element 11 is telescopic, or able to expand and contract, with a variable length L. The first member 111 and the second member 112 are not limited to the configuration in which one is housed in the other, but may have other configuration that makes the total length L variable while keeping them electrically connected to each other. In the illustrated example, the lower end of the second member 112 is supported on a support member 19.

The dielectric elastomer drive element 2 is an actuator to expand and contract the antenna element 11 of the antenna 1 to vary the length L. The dielectric elastomer drive element 2 of the present embodiment includes a dielectric elastomer layer 21, a pair of electrode layers 22, and a resilient member 25. In the present embodiment, the dielectric elastomer drive element 2 is housed in the second member 112 of the antenna element 11. However, this is merely an example, and the configuration of the dielectric elastomer drive element 2 is not particularly limited. For example, the dielectric elastomer drive element 2 may be disposed outside the antenna element 11.

The dielectric elastomer layer 21 is required to be elastically deformable and have a high dielectric strength. Examples of the material for the dielectric elastomer layer 21 include but not limited to silicone elastomer, acrylic elastomer, and styrene elastomer. In the illustrated example, the dielectric elastomer layer 21 forms a cylindrical shape. As shown in FIG. 2, in the illustrated example, the upper end of the dielectric elastomer layer 21 is fixed to the lower end of the first member 111, and the lower end of the dielectric elastomer layer 21 is fixed to the support member 19.

The paired electrode layers 22, to which a voltage is applied by the drive control unit 4, sandwich the dielectric elastomer layer 21. The electrode layers 22 are made of a material that is electrically conductive and also elastically deformable to follow the elastic deformation of the dielectric elastomer layer 21. A material such as a filler that provides the electrical conductivity may be added to an elastically deformable material. Preferred examples of the filler include carbon materials such as carbon nanotubes. In the present embodiment, electrode layers 22 are provided on the inner and outer surfaces of the dielectric elastomer layer 21 formed into a cylindrical shape.

The resilient member 25 may be a metal spring, for example, and provides resiliency to allow the expansion of the dielectric elastomer layer 21. In the illustrated example, the resilient member 25 is housed in the cylinder of the dielectric elastomer layer 21. The upper end of the resilient member 25 is fixed to the lower end of the first member 111, and the lower end of the resilient member 25 is fixed to the support member 19 that is electrically insulated.

The arrangement of the resilient member 25 is not limited to the illustrated example. Also, the dielectric elastomer drive element 2 is not limited to the configuration that includes the resilient member 25. For example, a plurality of dielectric elastomer layers 21 connected to each other may mutually apply a resilient force to function as an actuator.

The communication device 3 controls at least one of conventionally known transmission and reception of radio waves using the antenna 1. The communication device 3 is electrically connected to the antenna 1. In the illustrated example, the communication device 3 is connected to the antenna 1 by a conventionally known coaxial cable, for example.

The drive control unit 4 controls the driving of the dielectric elastomer drive element 2 and may include a power supply unit to apply a voltage to the paired electrode layers 22 of the dielectric elastomer drive element 2.

FIG. 2 shows the state when no voltage is applied by the drive control unit 4 to the dielectric elastomer drive element 2. In this state, deformation due to voltage application has not occurred in the cylindrical dielectric elastomer layer 21. On the other hand, the resilient member 25 is in the axially compressed state. The resilient member 25 thus possesses a resilient force to expand the dielectric elastomer layer 21 in the axial direction, whereby the dielectric elastomer layer 21 may be expanded in the axial direction.

FIG. 3 shows the state when a predetermined voltage is applied by the drive control unit 4 to the dielectric elastomer drive element 2. When a voltage is applied, the electrode layers 22 attract each other due to the Coulomb force. As a result, the dielectric elastomer layer 21 becomes thinner and increases its dimension in the axial direction. Such deformation and the resilient force of the resilient member 25 cause the dielectric elastomer drive element 2 to expand in the axial direction, so that the first member 111 moves upward in the figure relative to the second member 112. Thus, the length L of the antenna element 11 becomes longer. When the dielectric elastomer drive element 2 performs the illustrated expansion, the distance between the first member 111 and the ground surface G changes. This change in distance also changes a specific physical quantity on which the antenna characteristics of the antenna device A1 depend.

By appropriately adjusting the voltage applied by the drive control unit 4, the length L of the antenna element 11 can be changed continuously. For example, in the case of the antenna device A1, which is a monopole antenna, the voltage applied by the drive control unit 4 may be adjusted such that the length L of the antenna element 11 corresponds to ¼ of the wavelength (λ) of the radio wave to be transmitted and received. Such adjustment improves the impedance matching between the antenna device A1 and the communication device 3, resulting in a reduced voltage standing wave ratio.

The advantages of the antenna device A1 are described below.

According to the present embodiment, the length L, which is the physical length of the antenna element 11, can be changed by the dielectric elastomer drive element 2. The dielectric elastomer drive element 2, which is constituted of the dielectric elastomer layer 21 and the electrode layers 22, does not include metal parts in the essential components. Thus, as compared with an actuator such as a motor, the dielectric elastomer drive element 2 is easier to make smaller and lighter. Thus, the antenna device A1 can be made smaller and lighter while improving the antenna characteristics.

Also, as compared with e.g. a motor, the dielectric elastomer drive element 2 is less likely to generate noise in the transmission and reception of radio waves or unduly shield or absorb radio waves. Thus, even when the dielectric elastomer drive element 2 is incorporated in the antenna element 11 as is in the present embodiment, degradation of the antenna characteristics of the antenna device A1 is avoided.

Figure 4:
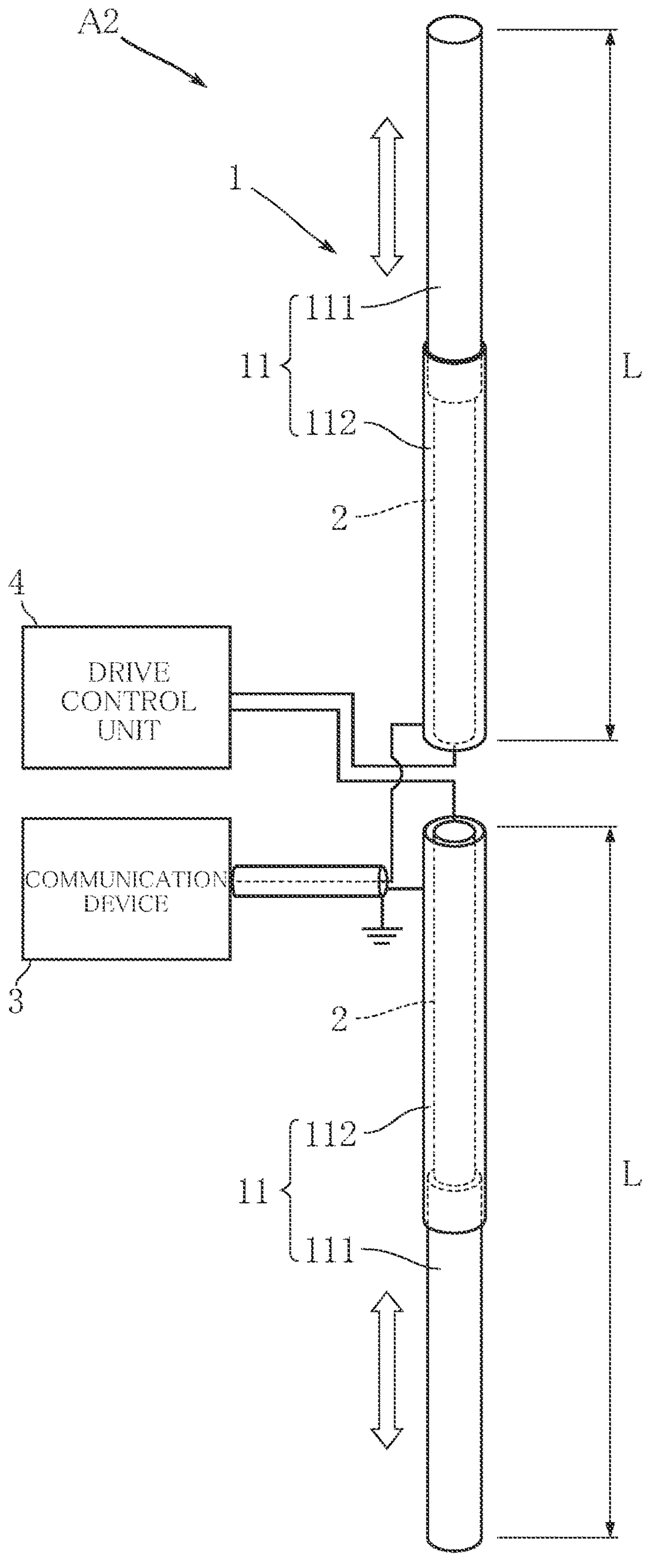
FIG. 4 is a configuration diagram of an antenna device according to a second embodiment of the present invention.
Figure 5:
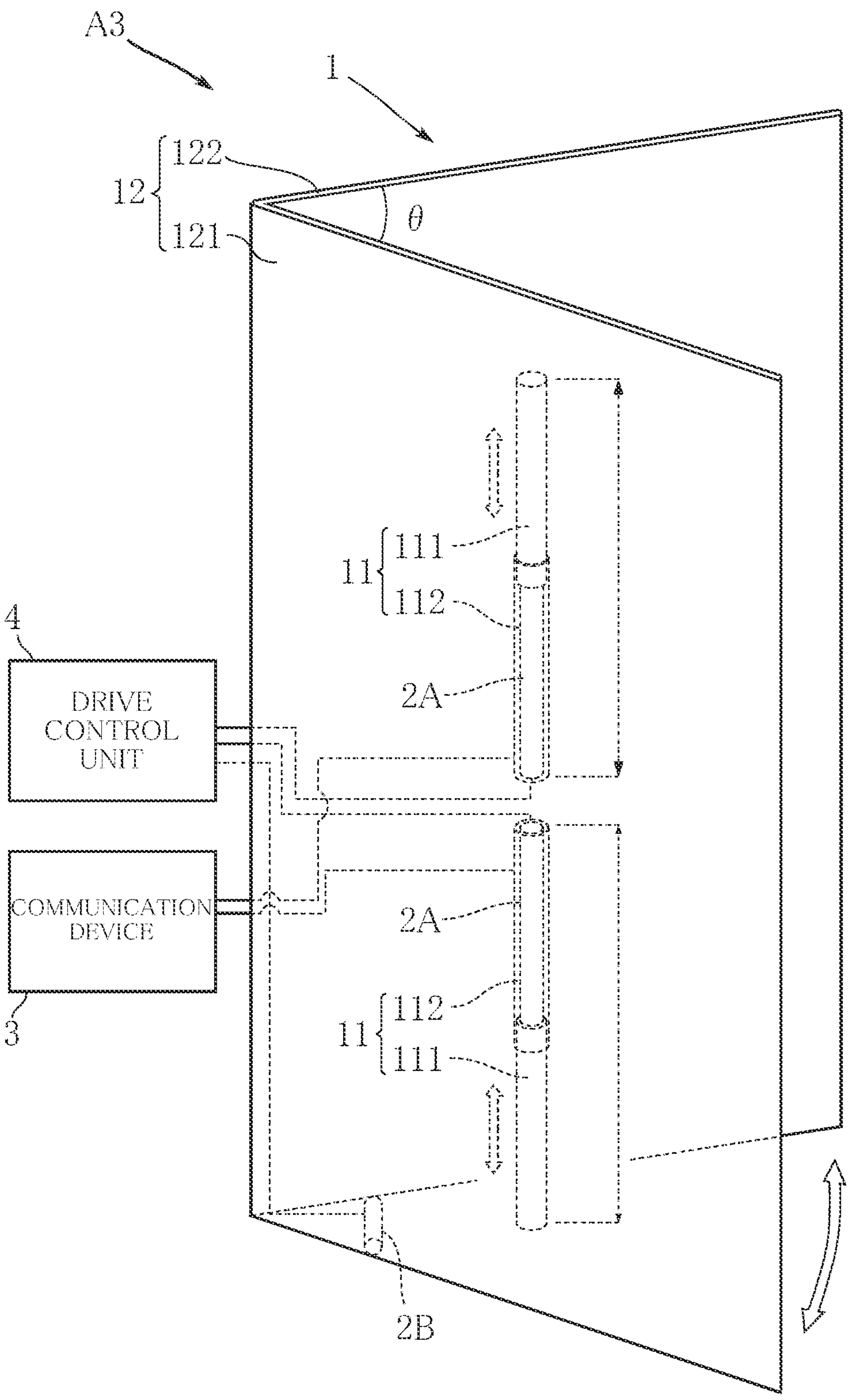
FIG. 5 is a configuration diagram of an antenna device according to a third embodiment of the present invention.
Figure 6:
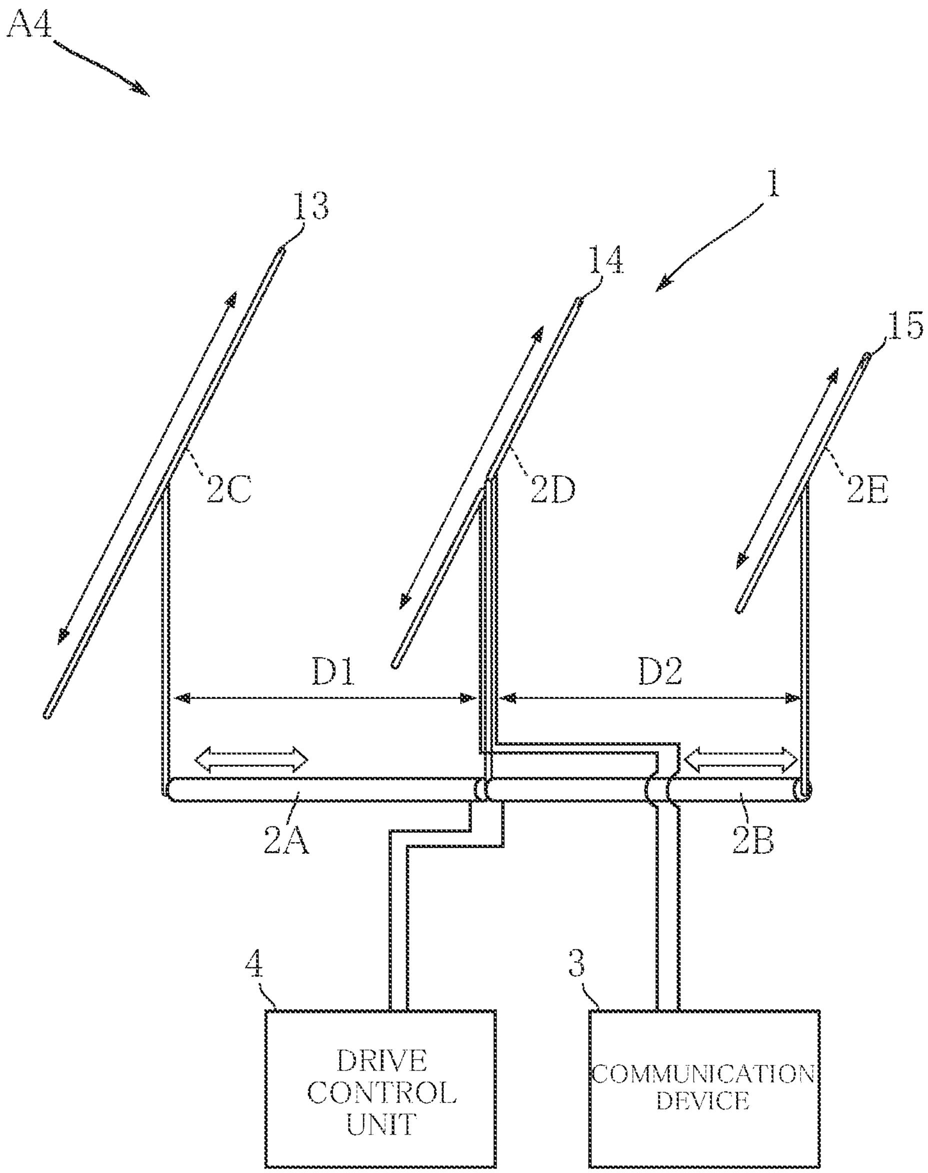
FIG. 6 is a configuration diagram of an antenna device according to a fourth embodiment of the present invention.

FIGS. 4-6 show other embodiments of the present invention. In these figures, the elements that are identical or similar to those of the foregoing embodiment are denoted by the same references signs as those used for the foregoing embodiment.

Second Embodiment

FIG. 4 shows an antenna device according to a second embodiment of the present invention. The antenna device A2 of the present embodiment includes an antenna 1 configured as a dipole antenna.

The antenna 1 of the present embodiment includes two antenna elements 11. The configuration of each antenna element 11 may be the same as or different from that of the antenna element 11 of the antenna device A1. In the illustrated example, use is made of antenna elements 11 having the same configuration as that of the antenna element 11 of the antenna device A1. The two antenna elements 11 are arranged to form an angle of 180° between them. In the illustrated example, the communication device 3 is connected to the two antenna elements 11 by a conventionally known coaxial cable. One of the antenna elements 11 is connected to the signal line terminal of the communication device 3 through the core wire (inner conductor) of the coaxial cable. The other antenna element 11 is connected to the shield wire (outer conductor) of the coaxial cable. Though not illustrated, in the following embodiments, it is preferable to use a coaxial cable as appropriate for connection between the antenna element 11 and the communication device 3.

The antenna device A2 includes two dielectric elastomer drive elements 2. The two dielectric elastomer drive elements 2 are provided to individually expand and contract the two antenna elements 11. The configuration of each dielectric elastomer drive element 2 is not particularly limited. In the illustrated example, the same configuration as that in the antenna device A1 is employed.

When the antenna 1 is a dipole antenna, the drive control unit 4 applies a voltage to the two dielectric elastomer drive elements 2 such that the total length L of the two antenna elements corresponds to ½ of the wavelength λ. Although the two antenna elements 11 can be individually expanded and contracted in the illustrated example, only a single dielectric elastomer drive element 2 may be provided to expand and contract the two antenna elements 11 in conjunction with each other.

According to the present embodiment again, the antenna device A2 can be made smaller and lighter while improving the antenna characteristics.

Third Embodiment

FIG. 5 shows an antenna device according to a third embodiment of the present invention. The antenna device A3 of the present embodiment includes an antenna 1 configured as a corner reflector antenna.

The antenna 1 of the present embodiment includes a reflector part 12 in addition to the two antenna elements 11 constituting the above-described dipole antenna. The reflector part 12 reflects the radio waves transmitted or received by the antenna elements 11 and is made of a metal, for example.

The reflector part 12 has a first reflection plate 121 and a second reflection plate 122. The reflection plates 121 and 122 are each a flat metal plate or a grid-shaped conductor plate. The reflection plates 121 and 122 are arranged to form an angle θ between them. The antenna 1 is disposed between the two reflection plates 121 and 122.

The antenna device A3 includes two dielectric elastomer drive elements 2A and one dielectric elastomer drive element 2B. The two dielectric elastomer drive elements 2A are actuators to individually expand and contract the two antenna elements 11. The dielectric elastomer drive element 2B is an actuator to open and close the reflection plates 121 and 122 to adjust the angle θ. The specific configuration of the dielectric elastomer drive elements 2A and the dielectric elastomer drive element 2B is not particularly limited. In the illustrated example, the same configuration as that of the dielectric elastomer drive element 2 of the antenna device A1 is employed.

According to the present embodiment again, the antenna device A3 can be made smaller and lighter while improving the antenna characteristics. Moreover, the directivity of the antenna device A3, which is an example of the antenna characteristics, can be changed by changing the angle θ by the dielectric elastomer drive element 2B.

As a variation of the antenna device A3, the distance between the antenna element 11 and the reflector part 12 may be made variable.

Fourth Embodiment

FIG. 6 shows an antenna device according to a fourth embodiment of the present invention. The antenna device A4 of the present embodiment includes an antenna 1 configured as a Yagi-Uda Antenna.

In the present embodiment, the antenna 1 includes a reflector 13, a radiator 14 and a director 15 that are spaced apart from each other. The length of the radiator 14 is set to ½ of the wavelength λ. The length of the reflector 13 is set to be longer than ½ of the wavelength λ. The length of the director 15 is set to be shorter than ½ of the wavelength λ.

In the illustrated example, the antenna device A4 includes dielectric elastomer drive elements 2A, 2B, 2C, 2D and 2E. The dielectric elastomer drive element 2A is an actuator to change the distance D1 between the reflector 13 and the radiator 14. The dielectric elastomer drive element 2B is an actuator to change the distance D2 between the radiator 14 and the director 15.

The dielectric elastomer drive elements 2C, 2D and 2E individually change the lengths of the reflector 13, the radiator 14 and the director 15, respectively, according to the wavelength λ. The configuration of the dielectric elastomer drive elements 2C, 2D and 2E may be the same as that of the dielectric elastomer drive element 2 or 2A of the above-described antenna device A2 or A3 and is not illustrated in FIG. 4 for convenience.

According to the present embodiment again, the antenna device A4 can be made smaller and lighter while improving the antenna characteristics. Unlike the present embodiment, when a motor is used to change a specific physical quantity of the antenna device A4, five motors need to be provided correspondingly to the five degrees of freedom (i.e., the dielectric elastomer drive elements 2A, 2B, 2C, 2D, 2E). Since the motors have metal components, they can hinder the transmission and reception of radio waves by the antenna elements 11. Thus, to provide the improved antenna characteristics, which is achieved by the antenna device A4 of the present embodiment, some measures need to be taken to eliminate the possible effects of the motors on the transmission and reception of radio waves. The present embodiment does not have such a problem.

The antenna device according to the present invention is not limited to the foregoing embodiments. The specific configuration of each part of the antenna device according to the present invention may be varied in design in many ways. The application of the antenna device according to the present invention is not limited. For example, the antenna device may be used for a portable information communication terminal.

The invention claimed is:

1. An antenna device comprising:

an antenna having an antenna element configured to transmit and/or receive radio waves; and a dielectric elastomer drive element including a dielectric elastomer layer having a cylindrical shape and a pair of electrode layers sandwiching the dielectric elastomer layer provided on inner and outer surfaces of the dielectric elastomer layer, the dielectric elastomer drive element formed separately from the antenna element and being capable of changing an antenna characteristic of the antenna, wherein the antenna device includes a first member and a second member, each of which is a rod-shaped member made of metal and is slidable relative to each other, the second member has a cylindrical shape, and the dielectric elastomer drive element is housed in the second member.

2. The antenna device according to claim 1, wherein the antenna characteristic is a voltage standing wave ratio for each frequency that depends on a specific physical quantity of the antenna, and the dielectric elastomer drive element is capable of changing the specific physical quantity.

3. The antenna device according to claim 2, wherein the specific physical quantity is a physical length of the antenna element of the antenna.

4. The antenna device according to claim 3, wherein the antenna comprises a monopole antenna or a dipole antenna.

5. The antenna device according to claim 1, wherein the antenna comprises a corner reflector antenna including the antenna element and a reflector part, the antenna characteristic is a voltage standing wave ratio that depends on at least one of a distance between the antenna element and the reflector part and an angle of the reflector part, and the dielectric elastomer drive element is capable of changing at least one of the distance between the antenna element and the reflector part and the angle of the reflector part.

6. The antenna device according to claim 1, wherein the antenna comprises a Yagi-Uda Antenna including a reflector, a radiator and a director arranged in a mentioned order, the antenna characteristic is a voltage standing wave ratio that depends on at least one of distances among the reflector, the radiator and the director, and the dielectric elastomer drive element is capable of changing at least one of the distances among the reflector, the radiator and the director.

* * * * *